United States Patent [19]
Miyamoto et al.

[11] Patent Number: 6,101,542
[45] Date of Patent: Aug. 8, 2000

[54] SERVICE MANAGEMENT METHOD AND CONNECTION ORIENTED NETWORK SYSTEM USING SUCH MANAGEMENT METHOD

[75] Inventors: Takahisa Miyamoto, Kawasaki; Sunao Sawada; Yoshikazu Tominaga, both of Yokohama, all of Japan

[73] Assignee: Hitachi, Ltd., Tokyo, Japan

[21] Appl. No.: 08/895,366

[22] Filed: Jul. 16, 1997

[30]  Foreign Application Priority Data

Jul. 19, 1996 [JP] Japan .................................. 8-190330

[51] Int. Cl.$^7$ ........................................... G06F 13/14
[52] U.S. Cl. ....................... 709/227; 709/223; 709/229; 370/232
[58] Field of Search ................... 370/397, 392, 370/395, 60.1, 84, 218, 232, 458, 399; 395/500, 856, 417, 828; 709/200, 153, 227, 223, 229, 238, 213, 230; 707/7; 714/4

[56]  References Cited

U.S. PATENT DOCUMENTS

| | | | |
|---|---|---|---|
| 5,506,844 | 4/1996 | Rao | 370/84 |
| 5,526,489 | 6/1996 | Nilakantan et al. | 709/200 |
| 5,530,822 | 6/1996 | Beavers et al. | 395/417 |
| 5,648,958 | 7/1997 | Counterman | 370/458 |
| 5,673,418 | 9/1997 | Stonier et al. | 395/500 |
| 5,699,345 | 12/1997 | Watanuki et al. | 370/232 |
| 5,764,909 | 6/1998 | Nishimura | 709/223 |
| 5,777,994 | 7/1998 | Takihiro et al. | 370/395 |
| 5,809,501 | 9/1998 | Noven | 707/7 |
| 5,812,551 | 9/1998 | Tsukazoe et al. | 370/399 |
| 5,818,842 | 10/1998 | Burwell et al. | 370/397 |
| 5,822,319 | 10/1998 | Nagami et al. | 370/392 |
| 5,825,766 | 10/1998 | Kobayashi et al. | 370/395 |
| 5,835,710 | 11/1998 | Nagami et al. | 709/213 |
| 5,884,046 | 3/1999 | Antonov | 709/238 |
| 5,887,193 | 3/1999 | Takahashi et al. | 395/828 |
| 5,925,137 | 7/1999 | Okanoue | 714/4 |
| 5,938,732 | 8/1999 | Lim et al. | 709/229 |
| 5,953,312 | 9/1999 | Crawley et al. | 370/218 |
| 5,978,846 | 11/1999 | Kimishima | 709/227 |

*Primary Examiner*—Frank J. Asta
*Assistant Examiner*—Thong Vu
*Attorney, Agent, or Firm*—Antonelli, Terry, Stout & Kraus, LLP

[57]  ABSTRACT

For a connection-oriented network system in which information terminals such as PC and WS are connected to a network such as LAN and WAN and a logical connection is established if necessary to a terminal to transfer data over the established connection, a service management method is provided which allows data transfer without connection management by a service application. A communication driver for data transfer is provided with a connection processing unit for establishing a connection to a transmission destination terminal and a connection queue for temporarily storing transmission data during a connection process. If a connection is still not established between terminals for data transmission, the connection processing unit stores the transmission data supplied from a service application in the connection queue, establishes a connection to the transmission destination terminal designated by the service application, and thereafter dequeues the transmission data from the connection queue to transmit the transmission data over the established connection.

27 Claims, 14 Drawing Sheets

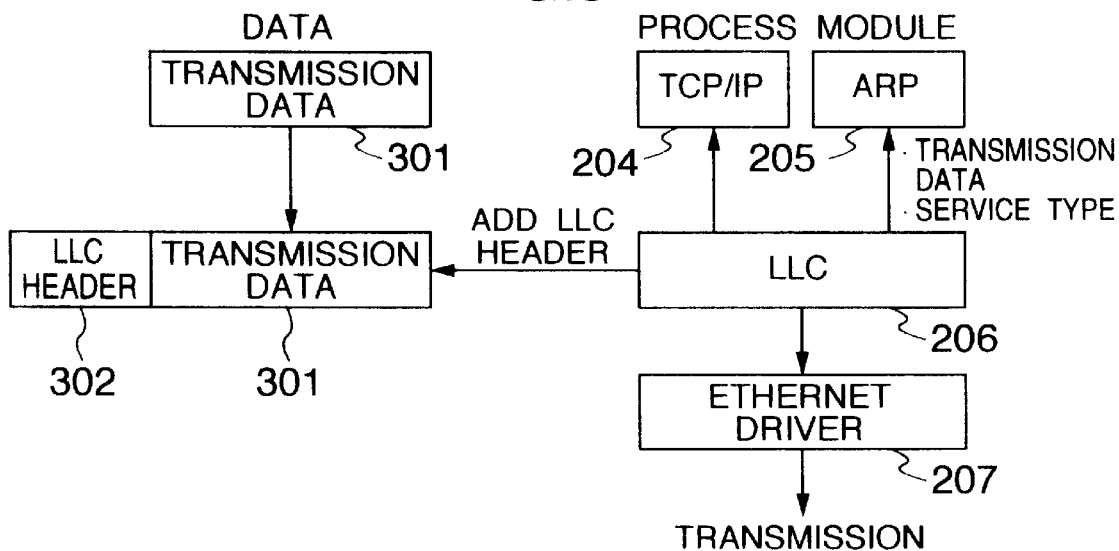
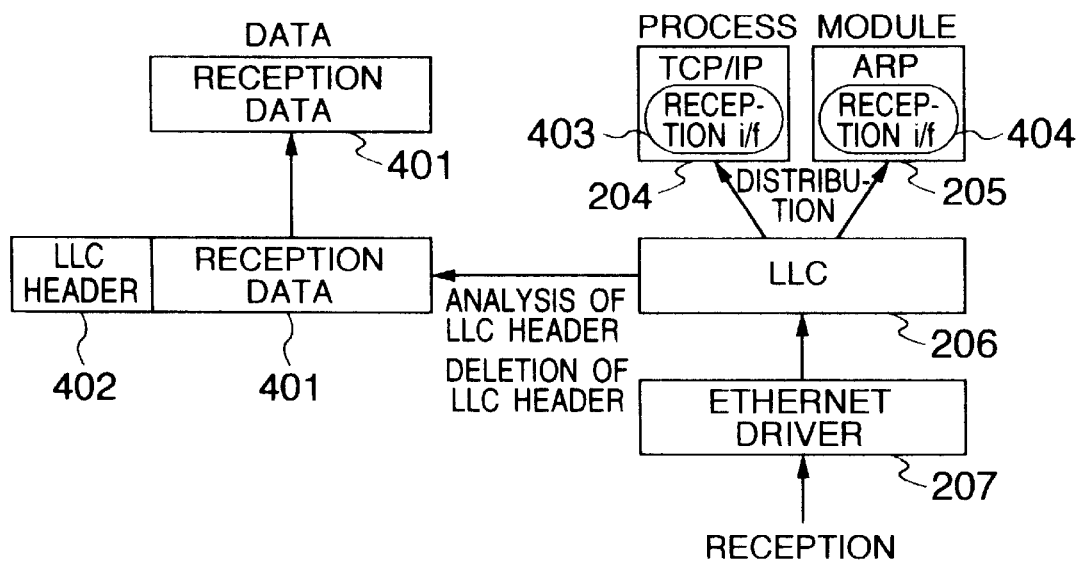
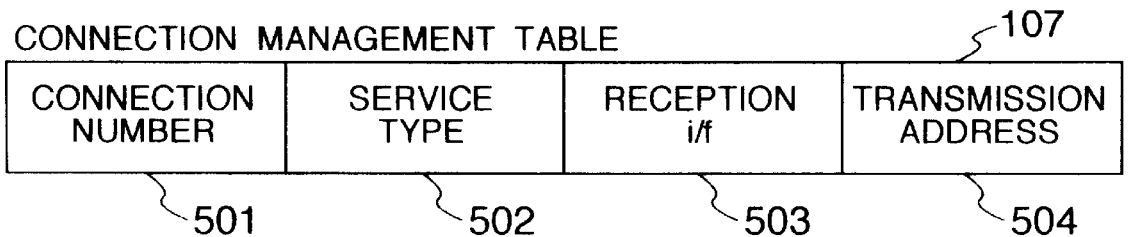

FIG.7

CONNECTION MANAGEMENT TABLE  107

| CONNECTION NUMBER | SERVICE TYPE | RECEPTION i/f | TRANSMISSION ADDRESS |
|---|---|---|---|
| 16 | ILMI | RECEPTION i/f B | 0 |
| 701 | 702 | 703 | 704 |

FIG.9

CONNECTION MANAGEMENT TABLE  107

| CONNECTION NUMBER | SERVICE TYPE | RECEPTION i/f | TRANSMISSION ADDRESS |
|---|---|---|---|
| 0 | LANE | RECEPTION i/f A | 0 |
| 901 | 902 | 903 | 904 |

FIG.11

CONNECTION MANAGEMENT TABLE  107

| CONNECTION NUMBER | SERVICE TYPE | RECEPTION i/f | TRANSMISSION ADDRESS |
|---|---|---|---|
| 100 | LANE | RECEPTION i/f A | CLIENT A |

FIG.13

CONNECTION MANAGEMENT TABLE  107

| CONNECTION NUMBER | SERVICE TYPE | RECEPTION i/f | TRANSMISSION ADDRESS |
|---|---|---|---|
| 0 | IPoverATM | RECEPTION i/f C | 0 |
| 1301 | 1302 | 1303 | 1304 |

FIG.14

CONNECTION MANAGEMENT TABLE 107

| CONNECTION NUMBER | SERVICE TYPE | RECEPTION i/f | TRANSMISSION ADDRESS |
|---|---|---|---|
| 101 | IPoverATM | RECEPTION i/f C | CLIENT B |

FIG.15

CONNECTION MANAGEMENT TABLE 107

| CONNECTION NUMBER | SERVICE TYPE | RECEPTION i/f | TRANSMISSION ADDRESS |
|---|---|---|---|
| 16 | ILMI | RECEPTION i/f B | 0 |
| 100 | LANE | RECEPTION i/f A | CLIENT A |
| 101 | IPoverATM | RECEPTION i/f C | CLIENT B |
| 102 | LANE | RECEPTION i/f A | CLIENT C |

CONNECTION MANAGEMENT TABLE 107

| CONNECTION NUMBER | SERVICE TYPE | RECEPTION i/f | TRANSMISSION ADDRESS |
|---|---|---|---|
| 16 | ILMI | RECEPTION i/f B | 0 |
| 100 | LANE | RECEPTION i/f A | CLIENT A |
| 103 | IPoverATM | RECEPTION i/f C | CLIENT A |
| 104 | IPoverATM | RECEPTION i/f C | CLIENT B |

1601, 1602, 1603, 1604

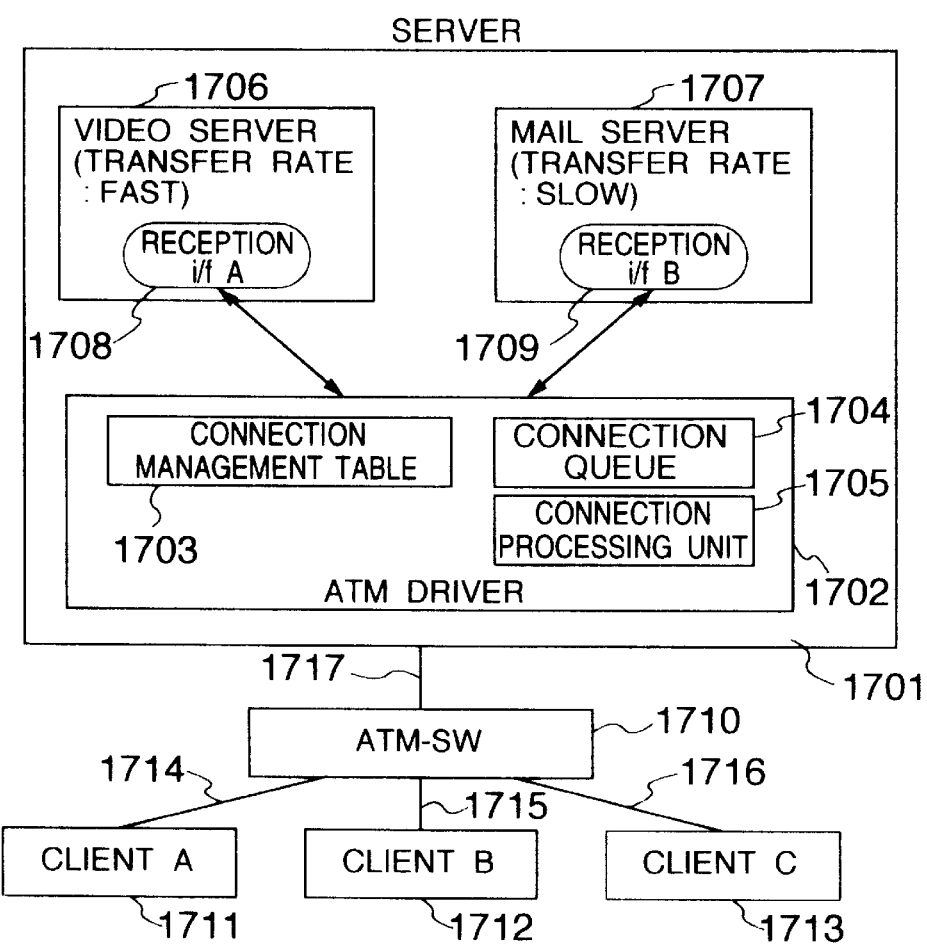

FIG.20

CONNECTION MANAGEMENT TABLE　　1703

| CONNECTION NUMBER | SERVICE TYPE | RECEPTION i/f | TRANSMISSION ADDRESS | TRANSFER RATE |
|---|---|---|---|---|
| 0 | VIDEO SERVER | RECEPTION i/f A | 0 | 100Mbps |
| 2001 | 2002 | 2003 | 2004 | 2005 |

FIG.22

CONNECTION MANAGEMENT TABLE　　1703

| CONNECTION NUMBER | SERVICE TYPE | RECEPTION i/f | TRANSMISSION ADDRESS | TRANSFER RATE |
|---|---|---|---|---|
| 200 | VIDEO SERVER | RECEPTION i/f A | CLIENT A | 100Mbps |

FIG.23

CONNECTION MANAGEMENT TABLE　　1703

| CONNECTION NUMBER | SERVICE TYPE | RECEPTION i/f | TRANSMISSION ADDRESS | TRANSFER RATE |
|---|---|---|---|---|
| 200 | VIDEO SERVER | RECEPTION i/f A | CLIENT A | 100Mbps |
| 201 | MAIL SERVER | RECEPTION i/f B | CLIENT B | 10Mbps |
| 202 | MAIL SERVER | RECEPTION i/f B | CLIENT C | 10Mbps |

FIG.24

TRANSMISSION DATA　　2401

| PRIORITY DEGREE | TRANSMISSION ADDRESS | SERVICE TYPE | DATA |
|---|---|---|---|
| 2402 | | | |

FIG.25
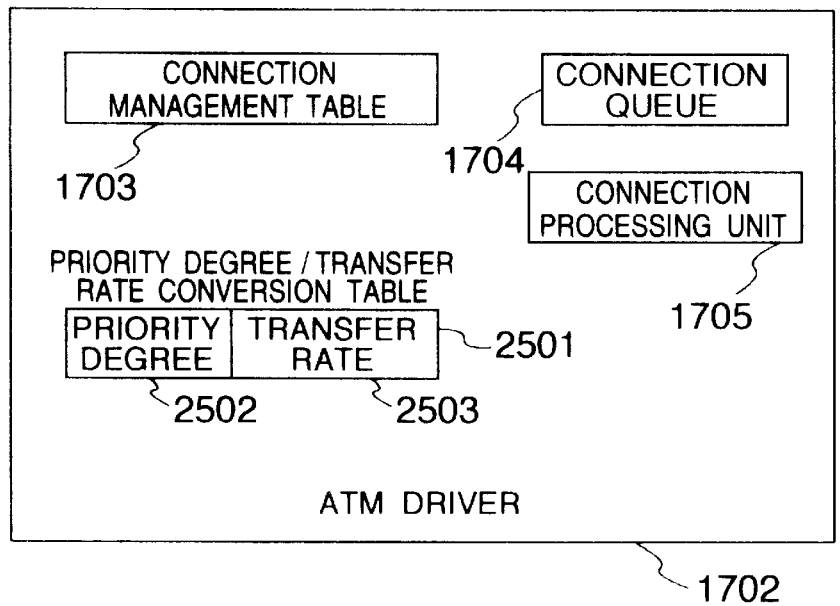
FIG.26
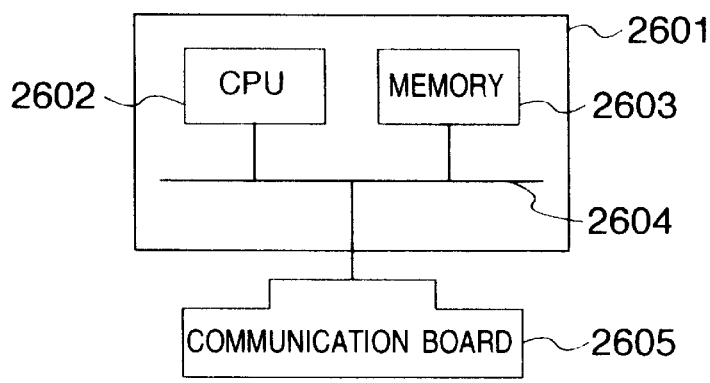
FIG.27
CONNECTION MANAGEMENT TABLE — 107
| CONNECTION NUMBER | SERVICE TYPE | RECEPTION i/f | TRANSMISSION ADDRESS |
|---|---|---|---|
| 100 | LANE | RECEPTION i/f A | CLIENT A |
| 2701 | 2702 | 2703 | 2704 |

CONNECTION MANAGEMENT TABLE 107

| CONNECTION NUMBER | SERVICE TYPE | RECEPTION i/f | TRANSMISSION ADDRESS |
|---|---|---|---|
| 101 | LANE | RECEPTION i/f A | CLIENT A |

2901

SERVICE MANAGEMENT METHOD AND CONNECTION ORIENTED NETWORK SYSTEM USING SUCH MANAGEMENT METHOD

BACKGROUND OF THE INVENTION

1. Field of the Invention

The present invention relates to a connection-oriented communication system such as an ATM network, and more particularly to a service management method for a connection-oriented communication system which allows a conventional connection-less communication service application to perform data communications without connection management.

2. Description of the Related Art

An example of a communication system to which the present invention is applied will be explained with reference to FIGS. 2, 3 and 4. In the communication system, a plurality of service applications are installed in information terminals (hereinafter referred to as "terminals") such as PCs (Personal Computers), WS (Work Stations) or the like and communications are conducted among a plurality of the terminals which are interconnected via a network such as LAN (Local Area Network), WAN (Wide Area Network) or the like.

With reference to FIG. 2, the configuration of the communication system will be described which uses TCP/IP (Transmission Control Protocol/Internet Protocol) over Ethernet (registered trademark of Xerox).

A server 201 is connected via Ethernet 209 to clients A 202 and B 203, and is implemented with TCP/IP 204, ARP (Address Resolution Protocol) 205, an LLC (Logical Link Control) unit 206, an Ethernet driver 207, and a communication board 208.

Twisted pair cables or coaxial cables are generally used as communication media of Ethernet 209.

TCP/IP 204 is a communication protocol used for communications between terminals and for the Internet.

ARP 205 is a communication protocol for TCP/IP 204 which converts a logical address (IP address) assigned to each terminal by a system manager into a physical address (MAC (Media Access Control) address) unique over the whole world assigned beforehand to each terminal communication board.

LLC 206 adds an LLC header to transmission data and deletes it from reception data. The LLC header contains numerical information representative of a type of each service application defined uniquely thereto, and is used for discrimination between higher level service applications (applications and protocols at a level higher than LLC) such as TCP/IP 204 and ARP 205.

The Ethernet driver 207 is an interface between the communication board 208 and LLC 206 for data transmission/reception therebetween.

The communication board 208 transfers communication data over Ethernet 209.

Next, the transmission process of this system will be described with reference to FIG. 3.

TCP/IP 204 and ARP 205 generate transmission data 301 and LLC 206 receives the transmission data 301 and its service application type.

LLC 206 generates an LLC header 302 from the received service type, adds it to the front of the transmission data 301 and sends the results to the Ethernet driver 207.

The Ethernet driver 207 which received the transmission data from LLC 206 issues a transmission request to the communication board 208 so that the transmission data is sent to a communication destination, client A 202 or B 203.

A transmission destination is designated by the MAC address described above.

Next, the reception process of this system will be described with reference to FIG. 4.

The Ethernet driver 207 passes reception data 401 containing the received LLC header 402, to LLC 206.

LLC 206 checks the LLC header 402 to determine the higher level service application to which the reception data 401 is to be sent. After the LLC header 402 is removed from the reception data 401, only the reception data 401 is sent to TCP/IP 204 or ARP 205.

In this case, it is necessary for the Ethernet driver 207 to know in advance reception interfaces (i/f) of higher level service applications such as TCP/IP 204 and ARP 205. Via the reception interface, the reception data 401 is passed to the higher service application.

The reception i/f is used for initiating a reception function and indicates a location (address) of a memory loaded in the terminal at which the reception function is stored.

TCP/IP 204 or ART 205 supplied with the reception data 401 executes necessary processes to terminate the reception procedure.

In this conventional example, Ethernet performs connection-less communications whose terminals are not required to establish a connection in advance. Connection-oriented communications on the assumption of which the present invention is embodied may be ATM (Asynchronous Transfer Mode).

Connection-oriented communications are characterized by connection establishment before data transmission between a communication driver (in the conventional example, Ethernet driver) and a communication destination.

Connection will be explained. A connection is a virtual path established between communication partners by a signaling process. As a transmission event occurs, a transmission originating terminal issues a signaling request to a transmission destination. The transmission destination which received the signaling request issues a signaling response. The transmission originating terminal that received this signaling response acquires a connection number to establish a connection between two partners. The connection number is given by an ATM-SW (switch) which interconnects the transmission originating terminal and transmission destination. Data transfer is performed over this established connection.

Documents which describe connection-oriented communications are, for example, "ATM Signaling Support for IP over ATM", RFC 1755 published by IETF (The Internet Engineering Task Force), February 1995.

SUMMARY OF THE INVENTION

The following issues are to be solved for the communications by connection-less service applications on a connection-oriented communication system.

1. Even if transmission data is supplied from a connection-less service application, the communication driver is required to transmit it over a proper connection.

2. Upon reception of communication data, the communication driver is required to determine a proper higher level service application to which the data is supplied.

3. Even if a new service application is implemented or installed, the communication driver is required to supply reception data to a proper higher level service application.

4. If a network can change a transfer rate, even a service application which cannot set the associated transfer rate is required to communicate at a desired transfer rate.

It is an object of the present invention to provide a service management method and a network system capable of solving the above issues.

In order to solve the above issues, according to one aspect of the present invention, a communication driver is provided with a connection management table, a connection processing unit and a connection queue. The connection management table stores therein a connection number, a service type, a reception i/f identifier, a transmission address. The connection number is specific to each connection and is used for discriminating between connections. The service type discriminates between higher level service applications. The reception i/f identifier identifies such as a reception function to which reception data is distributed. The transmission address such as an ATM address is designated by a service application for a transmission destination of transmission data. The connection processing unit issues a connection request to a transmission destination when a data transmission event occurs, or renews or creates a new connection management table if a connection request not registered in the connection management table is issued. The connection queue temporarily stores transmission data upon occurrence of a connection request.

At an initialization phase, a user registers a service type, reception i/f and transmission address in the connection management table.

During a connection process to a transmission destination terminal, the connection number assigned by ATM-SW is registered in the connection management table.

Upon reception of transmission (reception) data from a higher level service application, the communication driver searches the connection management table and transmits the transmission data over the connection identified by the searched connection number.

Upon reception of the transmission data, the communication driver searches the connection management table to determine a corresponding higher level service application and supplies the transmission (reception) data to this service application.

In order to enable designation of a transfer rate of transmission data, a transfer rate is registered in the connection management table.

During the initialization phase, the service type, reception i/f, transmission address and transfer rate are registered in the connection management table.

During the connection process to a transmission destination terminal, the connection number assigned by ATM-SW is registered in the connection management table.

Upon reception of the transmission data from a higher level application, the communication driver searches the connection management table and transmits the transmission data over the connection identified by the searched connection number, at the registered transfer rate.

In order to allow a higher level service application to designate a priority degree in units of transmission data, the communication driver is provided with a priority degree/transfer rate conversion table. A priority degree and a corresponding transfer rate are stored in advance in this table.

For data transmission, a higher level service application adds a priority degree and a transmission address to the transmission data.

The priority degree contained in the transmission data supplied from the higher level service application is converted into a corresponding transfer rate by referring to the priority degree/transfer rate conversion table. A connection is then established in accordance with the converted transfer rate and the transmission address contained in the transmission data to thereafter transfer the transmission data over the established connection at the converted transfer rate.

In the above manner, communications by connection-less service applications can be realized on a connection-oriented network system.

BRIEF DESCRIPTION OF THE DRAWINGS

FIG. 3 is a diagram illustrating the operation sequence of a conventional data transmission process.

FIG. 4 is a diagram illustrating the operation sequence of a conventional data reception process.

FIG. 5 is a diagram showing the structure of a connection management table of the embodiment shown in FIG. 1.

FIG. 7 is a diagram showing the contents of the connection management table after the initialization process shown in FIG. 6.

FIG. 9 is a diagram showing the contents of the connection management table after the initialization process shown in FIG. 8.

FIG. 11 is a diagram showing the contents of the connection management table after the completion of the connection process shown in FIG. 10.

FIG. 13 is a diagram showing the contents of the connection management table after the initialization process shown in FIG. 12.

FIG. 14 is a diagram showing the contents of the connection management table after the connection process shown in FIG. 12.

FIG. 15 is a diagram showing another example of the contents of the connection management table.

FIG. 16 is a diagram showing still another example of the contents of a connection management table.

FIG. 17 is a schematic block diagram showing the configuration of an ATM network system with a transfer rate control according to another embodiment of the invention.

FIG. 18 is a diagram showing the structure of a connection management table with a transfer rate control in the embodiment shown in FIG. 17.

FIG. 20 is a diagram showing the contents of the connection management table after the initialization process with the transfer rate control shown in FIG. 19.

FIG. 22 is a diagram showing the contents of the connection management table after the connection process with the transfer rate control shown in FIG. 19.

FIG. 23 is a diagram showing the contents of the connection management table during the communications between a video or mail server and a client A, B or C.

FIG. 24 is a diagram showing the structure of transmission data for a service application designating a priority degree.

FIG. 25 is a diagram showing the structure of an ATM driver provided with a priority degree/transfer rate conversion table according to another embodiment of the invention.

FIG. 26 is a block diagram showing the structure of a personal computer or workstation to which the invention is applied.

FIG. 27 is a diagram showing an example of the contents of a connection management table.

DESCRIPTION OF THE PREFERRED EMBODIMENTS

Embodiments of the invention will be described with reference to the accompanying drawings.

First, the structure of a PC or WS used by the embodiments will be described with reference to FIG. 26. Referring to FIG. 26, PC or WS 2601 includes a CPU 2602, a memory 2603 and a bus 2604, and is equipped with a communication board 2605. CPU 2602 reads programs stored in the memory 2603 at any time when necessary and executes them. The execution results are stored in the memory 2603. The memory 2603 stores therein programs and data. The bus 2604 is connected to CPU 2602, memory 2603 and the like for the data transfer therebetween. The communication board 2605 transfers data to and from another PC or WS.

Figure 1:
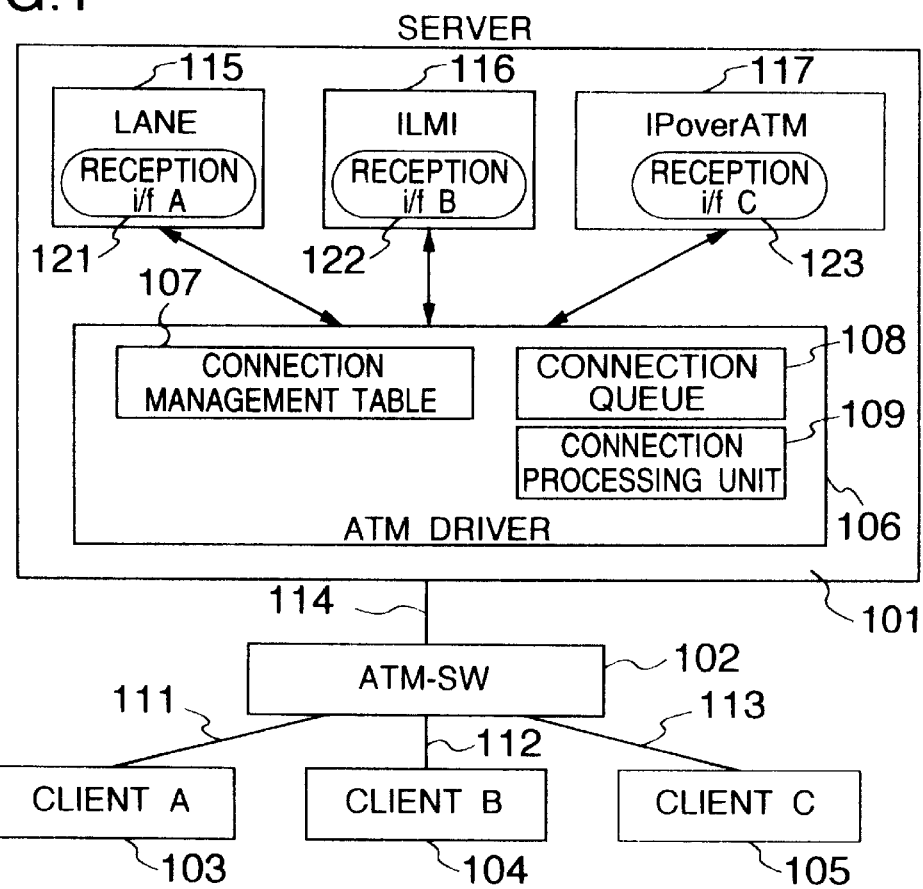
FIG. 1 is a schematic block diagram showing the configuration of an ATM network system according to an embodiment of the invention.
Figure 2:
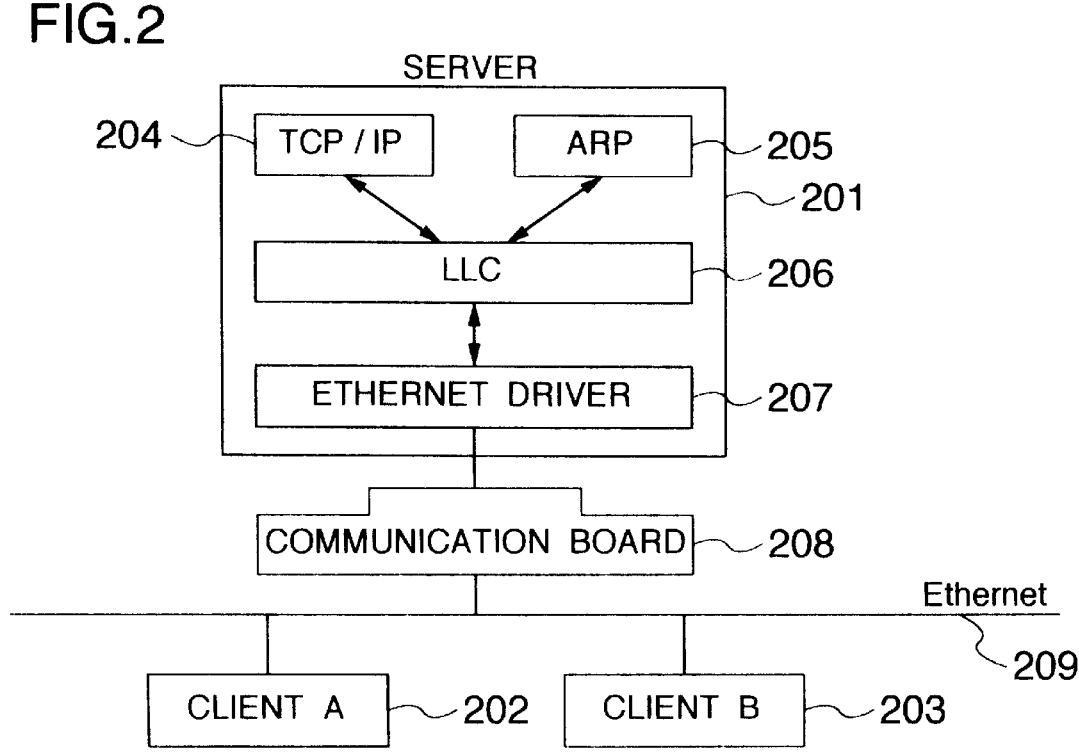
FIG. 2 is a schematic block diagram showing the configuration of a conventional Ethernet network system.

The embodiment shown in FIG. 1 is one example of connection-oriented communication systems using ATM. In this embodiment, service applications implemented in a server 101 include ILMI (Interim Local Management Interface) 116 for services such as address registration between an ATM-SW (switch) 102 and the server 101, IPoverATM 117 allowing application of TCP/IP over ATM, and LANE (LAN Emulation) 115 allowing application of networks other then TCP/IP over ATM.

Communications described with reference to FIGS. 1, 5, 6 and 7 assume that numerical connection number information on a connection between terminals is fixedly assigned by ATM-SW.

In the example shown in FIGS. 1, 5, 6 and 7, communications are performed between ILMI 116 and ATM-SW 102 with a fixed connection number of "16".

FIG. 1 is a diagram showing the system configuration of this embodiment.

The server 101 is an information terminal which transfers data via ATM-SW 102 to and from clients A 103, B 104 and C 105. The server 101 has an ATM driver 106, LANE 115, ILMI 116 and IPoverATM 117.

The ATM driver 106 performs data transmission to a client and data reception from a client, and has a connection management table 107, a connection processing unit 109 and a connection queue 108.

The connection management table 107 will be detailed with reference to FIG. 5.

The connection management table 107 registers combinations of four parameters. The number of combinations is variable depending upon the number of connections. The four parameters are a connection number 501, a service type 502, a reception i/f 503 and a transmission address 504. The connection number 501 is specific to each connection and is used for the ATM driver 106 or ATM-SW 102 to discriminate between connections. The service type 502 indicates the type of a service application such as LANE, ILMI and IPoverATM which uses the connection identified by the connection number 501. The reception i/f 503 is, for example, a reception function address for each service application. This reception function address is used when the reception function is initiated, and indicates a location of a memory of the terminal at which the reception function is stored. The transmission address 504 is, for example, an ATM address representative of a transmission destination.

The connection processing unit 109 issues a connection request if a connection is not established to a transmission destination designated by a higher level service application, or registers a connection number and a transmission address in the connection management table if a connection request is received from a terminal not registered in the connection management table.

The connection queue 108 temporarily stores transmission data while the connection processing unit 109 issues a connection request.

LANE 108, ILMI 116 and IPoverATM 117 provide various services in response to a process request from a client, and respectively have reception i/f 121, 122 and 123 which receive data from the ATM driver.

ATM-SW 102 supplies the server with higher level addresses, establishes a connection (assigns a connection number), and interconnects the server 101, clients A 103, B 104 and C 105 to determine a data transmission destination in accordance with the connection number. The clients A 103, B 104 and C 105 and server 101 are connected to ATM-SW 102 via lines 111, 112, 113 and 114, respectively.

The clients A 103, B 104 and C 105 are information terminals which transfer data to and from another terminal via ATM-SW 102.

For the convenience of description, the communication operations will be described paying attention mainly to the server 101. However it is noted that each client is also provided with service applications for requesting the server 101 to execute a particular process and with an ATM driver, similar to the server 101.

The sequence of the communication process will be described with reference to FIGS. 6 and 7.

The communication process includes an initialization phase 601, a data transmission phase 602 and a data reception phase 603.

The initialization phase 601 will be described first.

As an initialization process, a connection management table 107 is formed at the host set-up or immediately before the start of communications (at 604).

This table may be formed by a system manager who directly writes data from a keyboard (not shown) or the like into the connection management table 107, or by providing the server 101 with a file storing initialization information on ILMI 116, reading the data in this file, and writing it into the connection management table 107 when the server 101 is activated.

In this example, ATM-SW 102 has the fixed connection number "16" and the communication partner has no address. Therefore, as shown in FIG. 7, the contents of the connection management table are connection number 701 of "16", service type 702 of "ILMI", reception i/f 703 of "B", and transmission address 704 of "0".

Next, the data transmission phase 602 will be described. When an event of data transmission to ATM-SW 102 occurs in ILMI 116 at the host set-up or when a network board is enabled to communicate, ILMI 116 issues a data transmission request to the ATM driver 106 by using the service type of "ILMI", transmission address of "0" and transmission data as parameters (at 605).

The ATM driver 106 receiving the transmission request searches the connection management table 107 by using the service type "ILMI" and transmission address "0" as search keys (at 606). This search is performed by a table search unit (not shown) of the ATM driver.

Since the contents of the connection management table 107 are made as shown in FIG. 7 at the initialization phase 601, the connection number "16" is found.

The ATM driver 106 transmits the transmission data over the connection identified by the connection number "16", to ATM-SW 102 (at 607). The ATM driver 106 has transmission and reception units through not shown.

The transmission data is a lower address of the server 101, and the connection number is affixed to the start of the lower address as a header.

Upon reception of the lower address from the server 101, ATM-SW 102 generates a higher address of the server 101 and sends the higher and lower addresses of the server 101 back to the server 101.

Next, the data reception phase 603 will be described.

ATM-SW 102 transmits reception data over the connection identified by the connection number "16" (at 608).

Upon reception of this data, the ATM driver 106 searches the connection management table 107 by using the connection number "16" as a search key (at 609).

Since the contents of the connection management table 107 are made as shown in FIG. 7 at the initialization phase 601, the reception i/f "B" is found (at 610).

The ATM driver 106 supplies the reception data to the reception i/f "B" to terminate a series of operations described above.

Next, a data transfer process to be executed by the ATM driver over a connection not registered in the connection management table 107 will be described with reference to FIGS. 1, 8, 9, 10 and 11.

In this example, LANE 115 and the client A 103 shown in FIG. 1 execute data transfer.

The sequence of this process will be described with reference to FIG. 8.

The initialization process will be described first.

Figure 6:
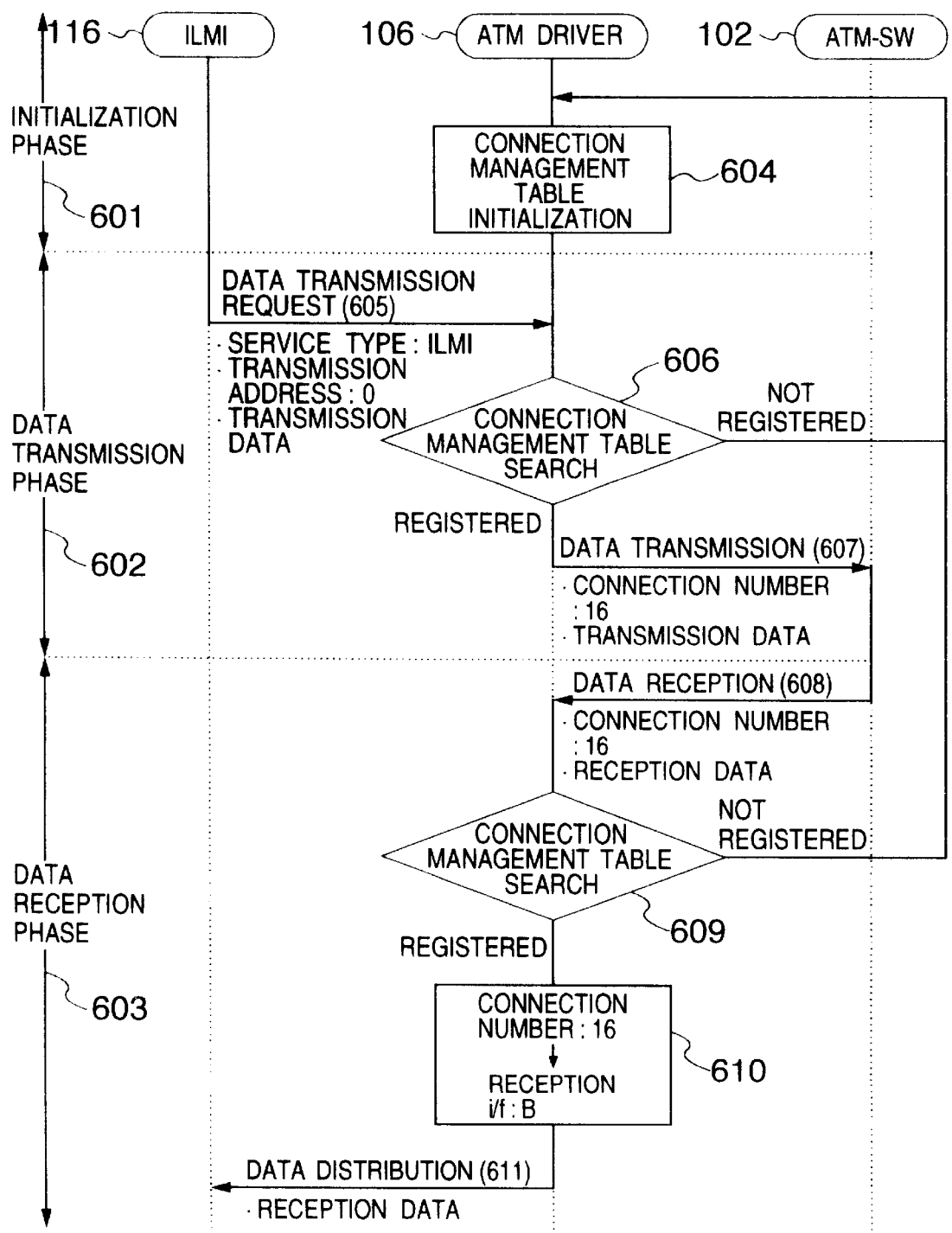
FIG. 6 is a flow chart illustrating the operations of an initialization process, a data transmission process and a data reception process when a connection number used for data transfer is already determined, according to the embodiment shown in FIG. 1.

The initialization phase 801 is performed in the manner described with FIG. 6. In this case, however, LANE 115 cannot know in advance the connection number of the connection over which data transfer is made. Therefore, only two parameters are registered in the connection management table 107, including the service type 902 of "LANE" and reception i/f 903 of "A". The connection number 901 and transmission address 904 are registered with "0s". Therefore, the contents of the table become as shown in FIG. 9.

Next, the data transmission phase 802 will be described.

When an event of data transmission to the client A 103 occurs in LANE 115, it issues a data transmission request to the ATM driver 106 by using the service type "LANE", transmission address "A" and transmission data as parameters (at 805).

The ATM driver 106 receiving the data transmission request searches the connection management table 107 by using the service type "LANE" and transmission address "A" as search keys (at 806).

Since such a combination of search keys is not found (still not registered), the connection management table 107 is renewed or updated (at 807) by using the parameters designated by LANE 115, and the process advances to a connection process (at 808).

Figure 10:
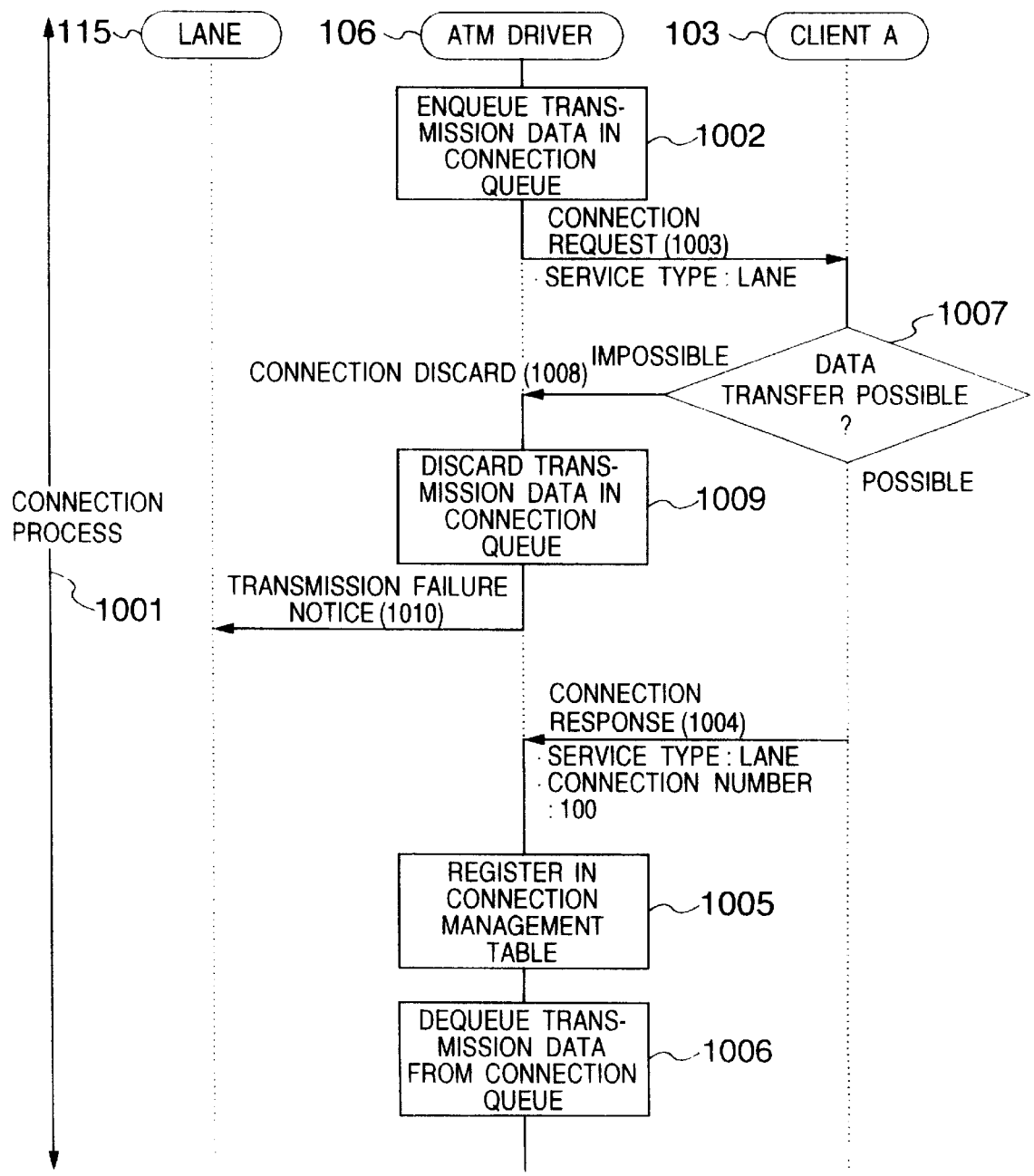
FIG. 10 is a flow chart illustrating the operation of a connection process to be executed for a partner still not establishing a connection.

This connection process 808 will be described with reference to FIG. 10.

First, the transmission data is temporarily stored (enqueued) in the connection queue 108 (at 1002).

Next, a connection processing unit 109 issues a connection request to the transmission address "A" designated by LANE 115 (at 1003).

The client A 103 received the connection request checks whether it is possible to transfer data to the subject service application (at 1007). If possible, a connection response (service type "LANE" and connection number "100") is transmitted to the server 101 (at 1004).

If not possible (for example, LANE is not implemented), a connection discard is transmitted (at 1008).

Upon reception of the connection discard from the client A 103, the ATM driver 106 discards the transmission data enqueued in the connection queue 108 (at 1009) and supplies LANE 115 with a transmission failure notice (at 1010).

Upon reception of the connection response from the client A 103, the ATM driver 106 reads the connection number and transmission address embedded in the response message, and registers them in the connection management table 107 (at 1005).

The connection number is assigned by ATM-SW 102 which operates to interconnect the server 101 and client A 103.

The contents of the connection management table 107 are therefore made as shown in FIG. 11.

Figure 8:
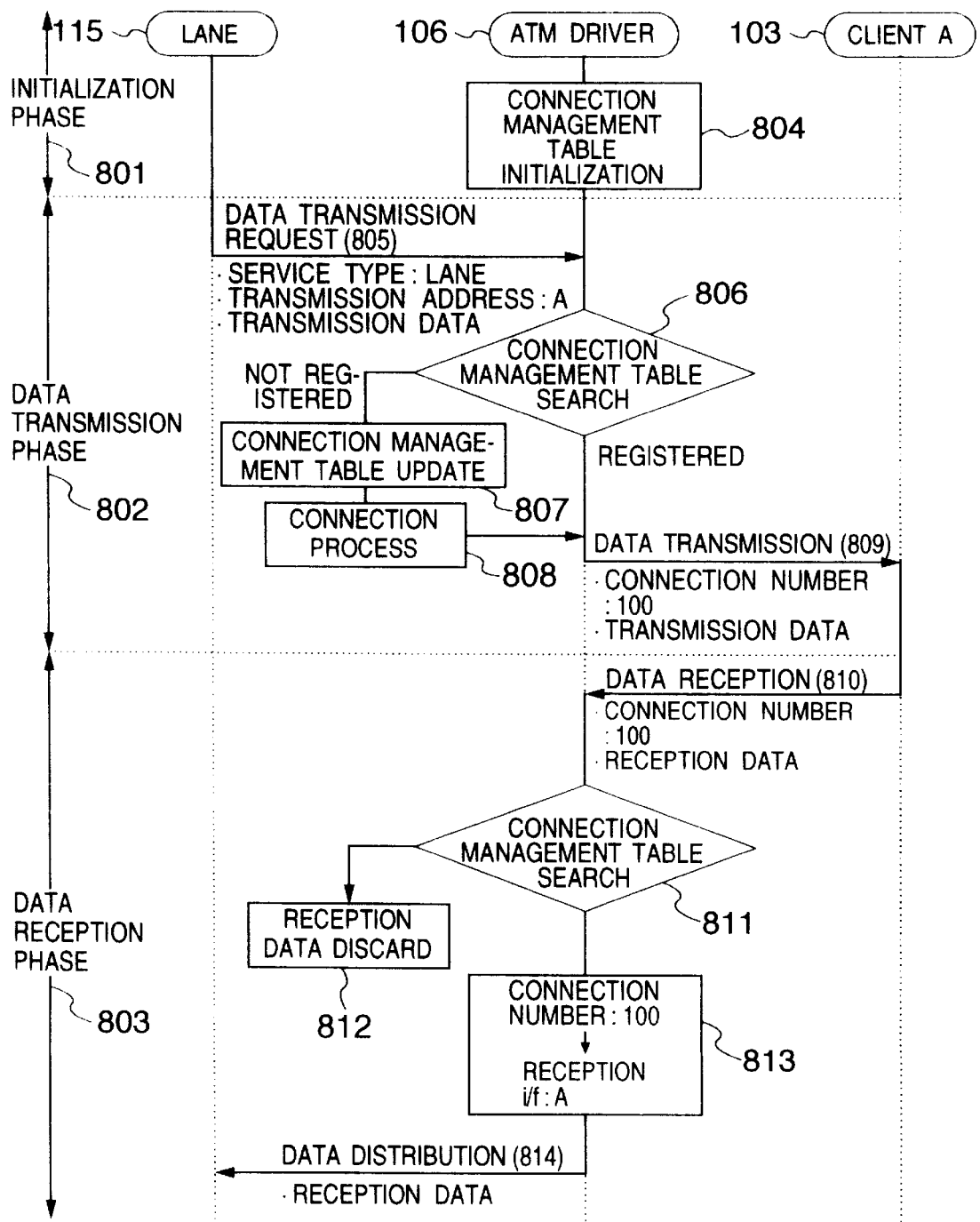
FIG. 8 is another flow chart illustrating the operations of an initialization process, a data transmission process and a data reception process when a connection number used for data transfer is still not determined, according to the embodiment shown in FIG. 1.

The transmission data is read (dequeued) from the connection queue 108 (at 1006), and the process advances to the transmission process shown in FIG. 8.

If the connection process is executed once, registration of the connection management table 107 is completed. Therefore, the search results are maintained registered thereafter so that the data is immediately transmitted to the transmission destination designated by LANE 115.

The ATM driver 106 transmits the transmission data to the client A 103 over the connection identified by the connection number "100" (at 809) to terminate the transmission process.

Next, the data reception phase 803 will be described. The client A 103 transmits reception data over the connection identified by the connection number "100" and this data is received by the ATM driver (at 810).

Next, the ATM driver 106 searches the connection management table 107 by using the connection number "100" added to the reception data as a search key (at 811).

Since the contents of the connection management table 107 are made as shown in FIG. 11 at the connection process 808, the reception i/f "A" is found (at 813).

The ATM driver 106 supplies the reception data to the reception i/f "A" (at 814) to terminate the reception process.

If data from the client is received before execution of the connection process, i.e., if data affixed with the connection number not actually established or data not affixed with the connection number is received, this connection number is still not registered in the connection management table so that the reception data is discarded (at 812). This data is therefore made invalid if the connection is not established.

Next, an operation when the ATM driver 106 receives the connection request not registered in the connection management table 107, will be described with reference to FIGS. 1, 12, 13 and 14.

In this example, data is transferred between IPoverATM 117 and the client B 104 shown in FIG. 1.

The sequence of processing will be described with reference to FIG. 12.

The initialization phase 1201 will be described first.

The initialization phase 1201 is performed in the manner described with FIG. 6. In this case, however, IPoverATM 117 cannot know in advance the connection number of the connection over which data transfer is made. Therefore, at a connection management table initialization (at 1203), only two parameters are registered in the connection management table 107, including the service type 1302 of "IPoverATM" and reception i/f of "C". The connection number 1301 and transmission address 1304 are registered with "0s". Therefore, the contents of the table become as shown in FIG. 13.

Next, the connection process 1202 will be described.

Upon reception of the connection request 1204 (connection number "101", and service type "PoverATM") transmitted from the client B 104, the ATM driver 102 searches the connection management table 107 by using the service type "PoverATM" as a search key (at 1205).

Since the connection management table 107 is registered as shown in FIG. 13 at the preceding initialization phase, this table is renewed or updated (at 1206) to the connection number "101" and destination address "B", the results being shown in FIG. 14.

Thereafter, the transmission/reception process described with FIG. 8 is performed.

If registration to the connection management table 107 is not performed, a connection discard is transmitted to the client B because the reception i/f of the upper service application cannot be known (at 1207).

In the above embodiment, one-to-one correspondence between the upper service application and client has been described. Communications between the upper service application and a plurality of clients may be performed. In this case, in the connection process shown in FIGS. 10 and 12, the connection processing unit establishes a connection in units of client between the server and each client to thereafter register a plurality of transmission addresses in the connection management table.

The contents of the connection management table 107 are as shown in FIG. 15 for communication 1501 between ATM-SW and ILMI, communication 1502 between the client A and LANE, communication 1504 between the client C and LANE and communication 1503 between the client B and IPoverATM.

Communications between a plurality of upper service applications and each client may also be performed. In this case, in the connection process shown in FIGS. 10 and 12, the connection processing unit establishes a connection in units of service application between the server and each client to thereafter register a plurality of service types in the connection management table.

The contents of the connection management table 107 are as shown in FIG. 16 for communication 1601 between ATM-SW and ILMI, communication 1602 between the client A and LANE, communication 1603 between the client A and IPoverATM, and communication 1604 between the client B and IPoverATM.

Figure 12:
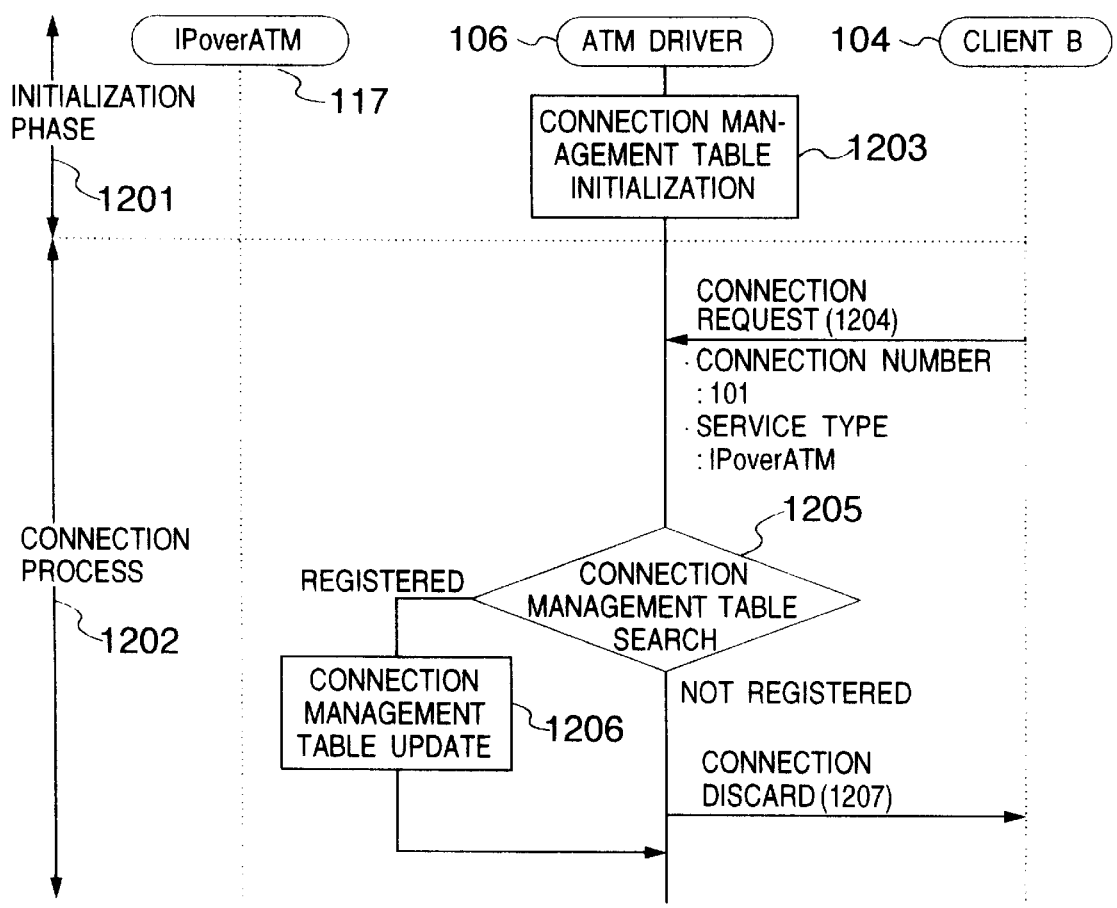
FIG. 12 is a flow chart illustrating the operation of an initialization process and a connection process when a connection request is received from a partner still not establishing a connection.

In the connection process shown in FIG. 12, if a connection request (change) is received from a terminal having an already established connection, the connection processing unit renews or updates the connection management table to a new connection number. Therefore, even if the connection number is changed during data transfer, the service application can perform data transfer transparently over the connection identified by the changed new connection number.

An example wherein the ATM driver 106 receives a connection request not registered in the connection management table 107 will be described with reference to FIGS. 1, 27, 28 and 29. In this embodiment, data transfer is executed between LANE 115 and the client A 103 shown in FIG. 1. It is assumed that as shown in FIG. 27 the connection management table 107 has already been formed having the contents of connection number 2701 of "100", service type 2702 of "LANE", reception i/f 2703 of "A", and terminal 2704 of "A".

Figures 28, 29:
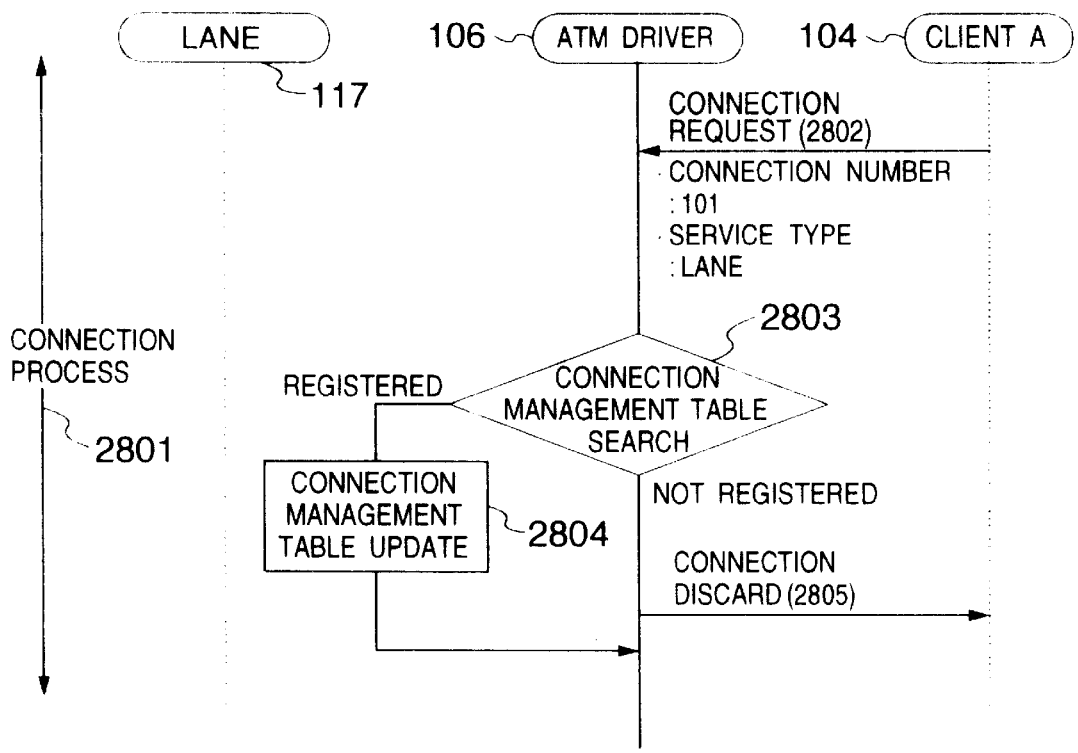
FIG. 28 is a flow chart illustrating the connection process when a request for a connection not registered in the connection management table shown in FIG. 27 is received.
FIG. 29 is a diagram showing the contents of the connection management table after execution of the connection process shown in FIG. 28.

The sequence of this process 2801 will be described with reference to FIG. 28. Upon reception of a connection request 280 (connection number of "101" and service type of "LANE") transmitted from the client A 103, the ATM driver 106 searches the connection management table 107 by using the service type "LANE" as a search key (at 2803). Since the contents of the connection management table 107 are as shown in FIG. 27, the connection number 2901 is renewed to "101" (at 2804). The resultant contents of the table are as shown in FIG. 29. Thereafter, the transmission/reception process described with FIG. 8 is executed. If the parameters are still not registered, a connection discard is transmitted to the client A (at 2805) even if the data is received because the reception i/f of the upper service application cannot be known.

In the above embodiment, a system having one server, three clients, and one SW has been described. The invention is also applicable even if these numbers are set as desired.

Furthermore, although the number of service applications on the server is three, this number may be set as desired for the application of this invention.

Next, another embodiment will be described wherein the invention is applied to priority control.

Priority control means a control of the order of transmissions and a control of transfer rate when communications are performed relative to a plurality of terminals or service applications.

A packet having a high priority or a high transfer rate early reaches a transmission destination terminal or service application.

In this embodiment, ATM with variable transfer rate is applied to a network system.

First, an example of a server having a video server and a mail server will be described in which the video server performs distribution services of video data whose transfer rate is not recognized by service applications and the mail server performs mail services.

The overall structure of this embodiment will be first described with reference to FIG. 17.

The server 1701 is connected via ATM-SW 1710 to clients A 1711, B 1712, and C 1713, and performs a process in response to a process request from each client. Reference numerals 1717, 1714, 1715 and 1716 represent connections via which the server 1701 and clients A 1711, B 1712, and C 1713 are connected to ATM-SW 1710.

The server 1701 has a video server 1706, a mail server 1707, and an ATM driver 1702.

The video server 1706 has a reception i/f 1708 of "A" for receiving reception data, and the mail server 1707 has a reception i/f 1709 of "B" for receiving a mail.

The ATM driver 1702 has a connection management table 1703, a connection queue 1704 and a connection processing unit 1705.

The connection management table 1703 stores therein, as shown in FIG. 18, a connection number 1801 which is an identifier of a connection via which transmission/reception data is transferred, a service type 1802 for discriminating between a plurality of service applications implemented at one terminal, a reception i/f 1803 for receiving reception data, a transmission address 1804 for discriminating between a plurality of transmission destination terminals, and a transfer rate 1805 representative of a transfer rate of each connection.

In this embodiment, the service type 1802 includes the video server 1706 and mail server 1707.

Since an ATM network is used, the transfer rate is assumed to be 0 to 155 Mbps (bit per second).

Next, data transfer between the video server 1706 and the client A 1711 will be described with reference to FIGS. 19, 20, 21 and 22.

The initialization phase 1901 is described first.

The initialization phase 1901 is performed in the manner described with FIG. 6. In this case, however, the video server 1706 cannot know in advance the connection number of the connection over which data transfer is made. Therefore, only three parameters (transmission address 2004 and connection number 2001 are assumed to be still not determined) are registered in the connection management table 1703, including the service type 2002 of "video server", reception i/f 2003 of "A" and transfer rate 2005 of "100 Mbps". Therefore, the contents of the connection management table 1703 become as shown in FIG. 20 (at 1904).

Since the video server 1706 is required to transfer a large amount of video data at high speed, it is assumed here that the transfer rate is 100 Mbps.

Next, the data transmission phase 1902 will be described.

When an event of data transmission to the client A 1711 occurs in the video server 1706, it issues a data transmission request to the ATM driver 1702 by using the service type "video server", transmission address "A" and transmission data as parameters (at 1905).

The ATM driver 1702 receiving the data transmission request 1905 searches the connection management table 1703 by using the service type "video server" and transmission address "A" as search keys.

Since such a combination of search keys is not found (still not registered), the connection management table 1703 is renewed (at 1907) by using the parameters designated by the video server 1706, and the process advances to a connection process (at 1908).

Figure 21:
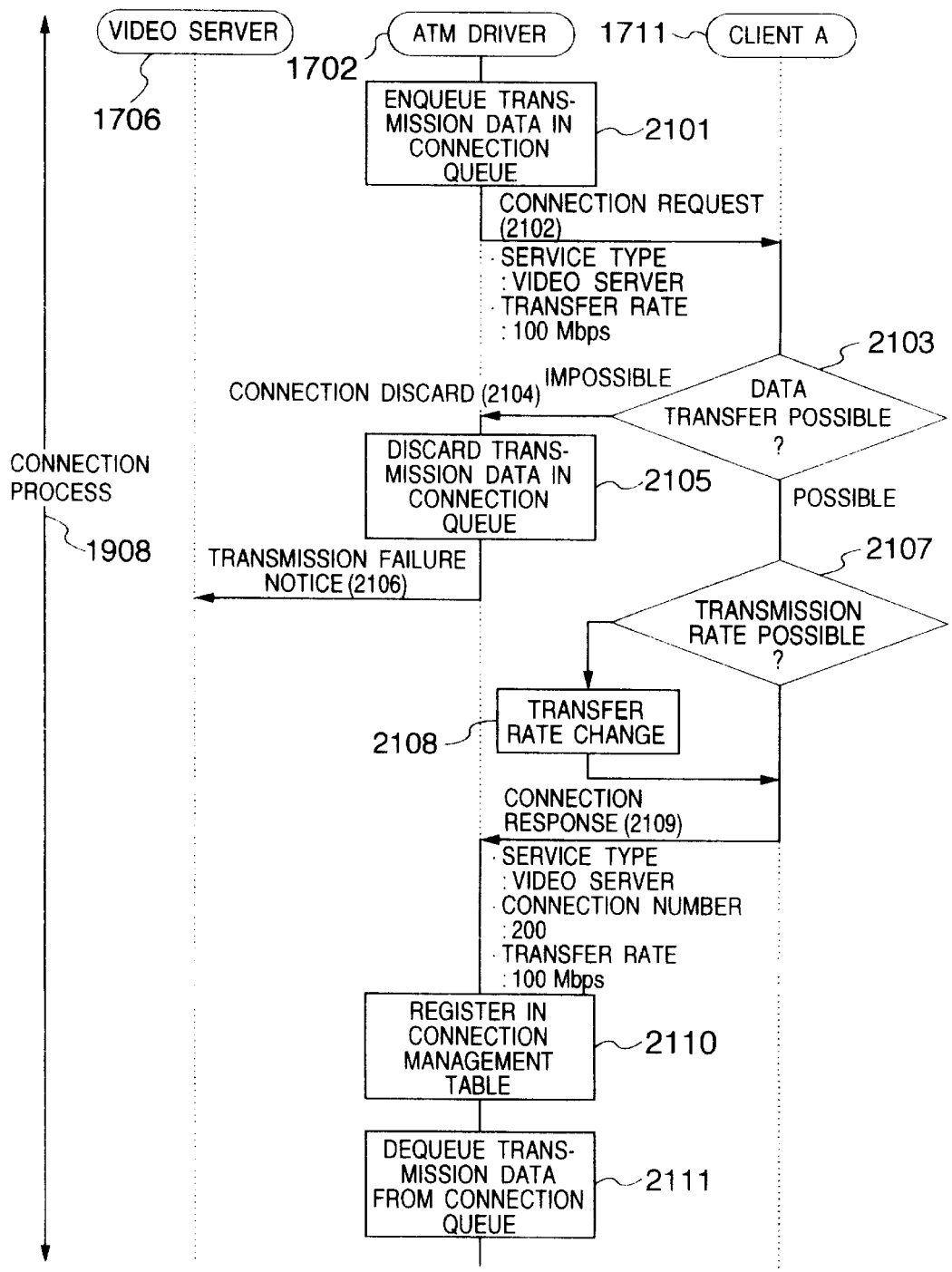
FIG. 21 is a flow chart illustrating the connection process with the transfer rate control shown in FIG. 19.

This connection process 1908 will be described with reference to FIG. 21.

First, the transmission data is temporarily stored (enqueued) in the connection queue 1704 (at 2101).

Next, a connection processing unit 1705 issues a connection request (service type "video server" and transfer rate "100 Mbps") to the transmission address "A" designated by the video server 1706 (at 2102).

At this time, the connection processing unit 1705 adds the transfer rate (100 Mbps) to the connection request 2102.

A mechanism of adding a transfer rate to the connection request 2102 is defined in UNI (User Network Interface) stipulated by the ATM forum of an ATM standardization institute.

The client A 1711 receives the connection request 2102 to check whether it is possible to transfer data to the subject service application (at 2103). If not (e.g., if a service application regarding the video server 1706 is not implemented), a connection discard is transmitted (at 2104).

If possible, it is checked whether communications are at a transfer rate notified by the connection request 2102 (at 2107). If the communications are impossible (e.g., if the ATM board at the client A 1711 can only communicate at 25 Mbps, or other reasons), the transfer rate is changed to an available transfer rate (at 2108).

A connection response (service type "video server", connection number "200" and transfer rate "100 Mbps") added with the transfer rate requested by the server 1701 or the changed transfer rate is transmitted to the server 1701 (at 2109).

Upon reception of the connection discard 2104 from the client A 1711, the ATM driver 1702 discards the transmission data enqueued in the connection queue 1704 (at 2105) and supplies the video server 1708 with a transmission failure notice (at 2106).

Upon reception of the connection response 2109 from the client A 1711, the ATM driver 1702 reads the connection number "200", transmission address and transfer rate embedded in the connection response, and registers them in the connection management table 1703 (at 2110).

The connection number is assigned by ATM-SW 1710 which operates to interconnect the server 1701 and client A 1711.

The contents of the connection management table 1703 are therefore made as shown in FIG. 22.

Figure 19:
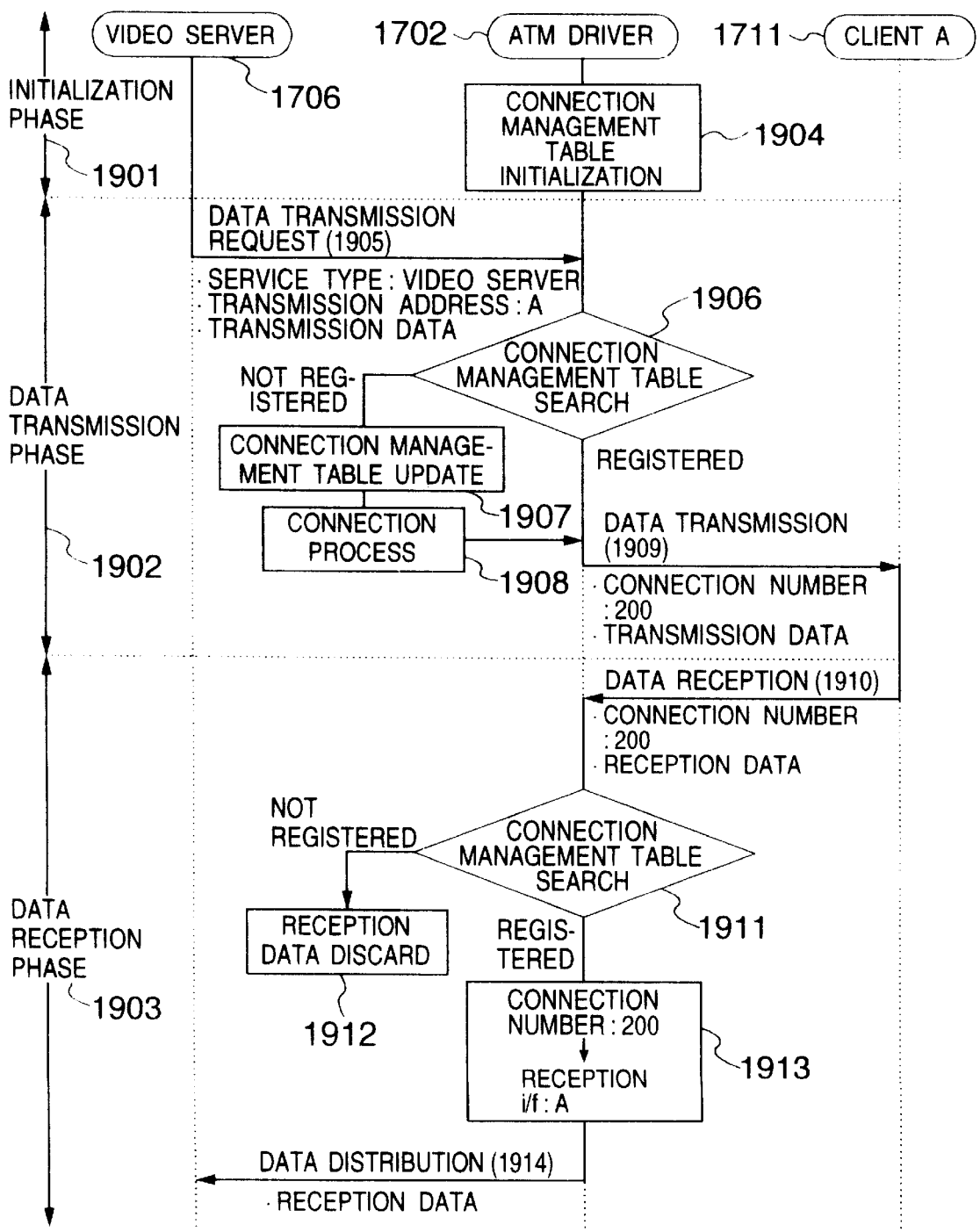
FIG. 19 is a flow chart illustrating a transfer rate control operation in the embodiment shown in FIG. 17.

The transmission data is read (dequeued) from the connection queue 1704 (at 2111), and the process advances to the data transmission phase shown in FIG. 19.

If the connection process 1908 is executed once, registration of the connection management table 1703 is completed. Therefore, the search results at the data transmission phase 1902 are maintained registered thereafter so that the data is immediately transmitted to the transmission destination designated by the video server 1706.

The ATM driver 1702 transmits the transmission data to the client A 1711 over the connection identified by the connection number "200" at the transfer rate of 100 Mbps (at 1909) to terminate the data transmission phase 1902.

Next, the data reception phase 1903 will be described.

The client A 1711 transmits data over the connection identified by the connection number "200" at the transfer rate of 100 Mbps and this data is received by the ATM driver 1702 (at 1910).

Next, the ATM driver 1702 searches the connection management table 1703 by using the connection number "200" added to the reception data as a search key (at 1911).

Since the contents of the connection management table 1703 are made as shown in FIG. 22 at the connection process 1908, the reception i/f "A" is found (at 1913).

The ATM driver 1702 supplies the reception data to the reception i/f "A" to terminate the reception process (at 1914).

If data from the client is received before execution of the connection process, this connection number is still not registered in the connection management table 1708 so that the reception data is discarded (at 1912).

In this example, communications between the video server 1706 and the client A 1711 have been described. If communications are performed also between the mail server 1707 and the client B 1712 and between the mail server 1707 and the client C 1713, then the contents of the connection management table 1703 become as shown in FIG. 23.

Since the transfer data by the mail server 1707 is small and is not necessary to be transferred at high speed, the transfer rate of the mail server 1707 is set to 10 Mbps.

Next, an operation when the higher level service application can designate a priority degree in units of transmission data, will be described.

An example of service applications capable of designating a priority degree is TCP/IP version 6. With this service application, a priority degree 2402 is designated by embedding it in the transmission data 2401.

The ATM driver 1702 is provided with a priority degree/transfer rate conversion table 2501 shown in FIG. 25.

The priority degree/transfer rate conversion table 2501 is constituted of a priority degree field 2502 and a transfer rate field 2503 which are generated at the initialization phase described with FIG. 19.

This table may be formed by a system manager who directly writes data from a keyboard (not shown) or the like into the priority degree/transfer rate conversion table 2501, or by providing the server 1701 with a file storing conversion data, reading the data in this file, and writing it into the priority degree/transfer rate conversion table 2501 when the server 1701 is activated.

Next, the data transfer with a priority degree being designated will be described.

Upon reception of a data transmission request from the higher level service application, the connection processing unit 1705 of the ATM driver 1702 reads the priority degree 2402 contained in the transmission data 2401 and acquires the corresponding transfer rate from the priority degree/transfer rate conversion table 2501.

The connection processing unit 1705 adds the transfer rate to the connection request to establish a connection to the transmission destination, and thereafter the data transfer is executed in the manner described with FIG. 19. The process by ATM-SW 102 is described in RFC 1755 cited earlier.

In the above example, the higher level service application designates the priority degree and converts it into the transfer rate by using the priority degree/transfer rate conversion table 2501. The invention is applicable also to the case wherein the higher level service application directly designates the transfer rate.

In this case, as the higher level service application designates the transfer rate, the connection processing unit of the ATM driver 1702 adds the transfer rate to the connection request to establish a connection to the transmission destination, and thereafter the data transfer is executed in the manner described with FIG. 19.

In the above embodiments, ATM has been used in a connection-oriented network by way of example. The invention is also applicable to other connection-oriented networks without using ATM.

In the above embodiment, ATM with variable transfer rate is used in a network. The invention is also applicable to other networks with variable transfer rate other then ATM.

In the above embodiment, although the transfer rate between terminals or service applications is determined by the connection process, the invention is also applicable to networks other than connection-oriented networks.

In this case, a resource reservation protocol such as RSVP (Resource reSerVation Protocol) may be activated between terminals or service applications and the transfer rate determined therebetween is stored in the connection management table to allow communications at a proper transfer rate.

The above embodiments have the following advantages.

Data transfer on a connection-oriented network can be performed without requiring the service application to pay attention to connections.

Even there are a plurality of higher level service applications, reception data can be supplied to a proper service application without analysis of reception data each time it is received.

Even if a connection request is received from a new terminal still not connected, data transfer is permitted over this connection.

Even if a connection used already is changed to a new connection, data transfer is permitted over this new connection.

It is possible to use a new service application without changing the communication driver.

It is possible to designate a transfer rate in units of service application and to transfer data at the designated transfer rate without changing the service application.

What is claimed is:

1. A service management method for a connection oriented network system in which terminals are connected to a network and a logical connection is established between terminals, as required to transfer data over the established connection, said method comprising the steps of:

preparing a connection processing unit, a connection management table and a connection queue at a communication driver of a transmission originating terminal including at least one service application from which data is transmitted to a transmission destination terminal, said connection management table managing a correspondence between a transmission address and a connection number, said transmission address being used by said service application to identify the transmission destination terminal, and said connection number being assigned by a switch interconnecting terminals for allowing said communication driver and said switch to discriminate between connections, said connection processing unit establishing a connection to the transmission destination terminal, and said connection queue temporarily storing transmission data during a connection process;

said connection processing unit registering a transmission address and a corresponding connection number in said connection management table during a connection process;

when a data transmission request is made to said communication driver by a service application, said communication driver referring to said connection management table, acquiring a connection number in accordance with a transmission address designated by said service application and transmitting transmission data from said service application over a connection identified by said acquired connection number; and if a connection is not established between said transmission originating terminal and said transmission destination terminal for data transmission, said connection processing unit loading said transmission data supplied from said service application of said transmission originating terminal in said connection queue, establishing a connection to said transmission destination terminal designated by said service application, and after establishing the connection, dequeuing said transmission data from said connection queue; and said communication driver transferring said dequeued transmission data over said established connection.

2. A service management method according to claim 1, wherein said connection management table is adapted to manage a plurality of sets of a correspondence among a transmission address, a connection number and a service type, said service type identifying the type of a service application, wherein said connection processing unit registers one or more sets of a connection number, a transmission address designated by a service application and a corresponding service type of said service application in association with each other in said connection management table during a connection process; and said connection processing unit establishes one or more connections having the registered connection numbers to terminals for each service application, and transmits transmission data over said established connections.

3. A service management method according to claim 1, wherein said connection management table at said communication driver is adapted to manage a plurality of sets of a service type for identifying a type of a service application, a corresponding reception interface identifier containing a reception function address of said service application and a corresponding connection number in association with each other, wherein said connection processing unit registers one or more sets of a service type, a corresponding reception interface identifier of a service application and a corresponding connection number in association with each other in said connection management table curing a connection process; and during data reception, said communication driver refers to said connection management table, and determines a service application and a reception interface to which reception data is supplied, in accordance with the connection number assigned to the reception data, to thereby allow one or more service applications to be implemented on said transmission destination terminal without analysis of the reception data each time the reception data is received.

4. A service management method according to claim 3, wherein if a new service application is added, the service type of said new service application and the reception interface identifier are registered in said connection management table and said connection processing unit registers during the connection process the connection number in said connection management table, to thereby allow said communication driver to transfer the reception data to said new service application without changing said communication driver so as to compatible with said new service application.

5. A service management method according to claim 1, wherein:

said connection processing unit reads the service type contained in a connection request from a terminal and registers the read service type in said connection management table; and if a new connection request is received from a terminal still not establishing a connection, said connection processing unit registers the service type and the connection number designated by said new connection request in said connection management table, to thereby enable data transfer upon reception of a connection request from an optional terminal.

6. A service management method according to claim 5, wherein:

if a new connection request to a service application is received from a terminal already establishing a connection to the same service application, said connection processing unit renews the connection number in said connection management table corresponding to the service type designated by said new connection request from the terminal, to thereby enable data transfer over the changed connection even if the connection number of the terminal already establishing the connection is changed.

7. A service management method according to claim 5, wherein:

if a new connection request to a new service application is received from a terminal already establishing a connection, said connection processing unit registers the service type and the connection number designated by said new connection request from the terminal in said connection management table, to thereby establish a plurality of connections to terminals and enable data transfer over the established connections.

8. A service management method according to claim 1, wherein said terminal includes at least one of a personal computer and a workstation.

9. A service management method according to claim 1, wherein said network is a LAN.

10. A service management method according to claim 1, wherein said network is a WAN.

11. A service management method for a network system interconnecting terminals via a network, said method comprising the steps of:

preparing a connection management table at a communication driver of a transmission originating terminal, said communication driver being used for data transfer, and said connection management table managing a correspondence between a transfer rate and a transmission address used by a service application for identification of a transmission destination terminal;

registering a transmission address and a transfer rate in said connection management table during an initialization process;

when a data transfer request is made from a service application, said communication driver referring to said connection management table for data transmission and acquiring said transfer rate in accordance with the transmission address designated by said service application; and transmitting transmission date at said acquired transmission rate, to thereby enable data transfer between terminals at an optional transfer rate.

12. A service management method according to claim 11, wherein it is checked whether communications between terminals are possible at said transfer rate registered in said connection management table to thereby enable data transfer at a proper transfer rate.

13. A service management method for a network system interconnecting terminals via a network, said method comprising the steps of:

preparing a connection management table at a communication driver of a transmission originating terminal, said communication driver being used for data transfer, and said communication management table managing a correspondence between a service discriminating between service applications and a transfer rate;

registering a service type and a transfer rate in said connection management table during an initialization process; when a data transmission request is made from a service application, said communication driver referring to said connection management table for data transmission and acquiring the transfer rate in accordance with the service type designated by said service application; and transmitting data at said acquired transfer rate, to thereby enable data transmission between service applications at an optional transfer rate.

14. A service management method according to claim 13, wherein it is checked whether communications are possible at said transfer rate registered in said connection management table to thereby enable data transfer at a proper transfer rate.

15. A service management method for a connection oriented network system in which terminals are connected to a network and a logical connection is established between terminals, as required to transfer data over the established connection, said method comprising the steps of:

preparing a connection processing unit, a connection management table and a connection queue at a communication driver of a transmission originating terminal including at least one service application from which data is transmitted to a transmission destination terminal, said connection management table managing a correspondence among a transmission address, a connection number, a service type and a transfer rate, said transmission address being used by said service application to identify the transmission destination terminal, and said connection number being assigned by a switch interconnecting terminals for discrimination between connections by said communication driver and said switch, said connection processing unit establishing a connection to the transmission destination terminal, and connection queue temporarily storing transmission data during a connection process;

said connection processing unit registering a transmission address and a corresponding connection number in said connection management table during a connection process;

registering during an initialization process the transmission address end the transfer rate in said connection management table;

when a data transmission request is made from a service application, said communication driver referring to said connection management table, acquiring a connection number and a transfer rate in accordance with a transmission address designated by said service application and transmitting transmission data from said service application over a connection identified by said acquired connection number at the acquired transfer rate; and if a connection is not still established between said communication driver and said transmission destination terminal for data transmission, said connection processing unit loading said transmission data supplied from said service application in said connection queue, establishing a connection to said transmission destination terminal designated by said service application in accordance with said transfer rate registered in said connection management table, and after establishing the connection, dequeuing said transmission data from said connection queue; and said communication driver transferring said dequeued transmission data over said established connection at said transfer rate.

16. A service management method according to claim 15, wherein said step of establishing a connection includes a step of said connection processing unit sending a connection request to said transmission destination terminal, wherein the connection processing unit of said transmission destination terminal receiving said connection request judges whether communications are possible at the transfer rate designated by said connection request, and if not, sends back a connection response by changing the transfer rate to another transfer rate, and said connection processing unit of said transmission originating terminal received said connection response renews the value of the transfer rate stored in said connection management table to perform data transfer at said renewed transfer rate.

17. A service management method according to claim 16, further comprising the steps of:

a higher level service application issuing a data transmission request by sending the transmission data containing the transmission address and the transfer rate to said communication driver;

if a connection is not established between said communication driver and said communication destination terminal for data transfer, said connection processing unit loading said transmission data supplied from said higher level service application in said connection queue, establishing a connection in accordance with said transmission address and said transfer rate contained in said transmission data supplied from said higher level service application, and thereafter dequeuing said transmission data from said connection queue; and said communication driver transferring said transmission data over said established connection at said transfer rate.

18. A service management method according to claim 16, further comprising the steps of:

preparing a priority degree/transfer rate conversion table at said communication driver, said conversion table storing a priority degree and a corresponding transfer rate;

a higher level service application issuing a data transmission request by sending the transmission data containing the transmission address and the priority degree to said communication driver;

if a connection is not established between said communication driver and said communication destination terminal for data transfer, said connection processing unit loading said transmission data supplied from said higher level service application in said connection queue, referring to said priority degree/transfer rate conversion table to acquire the transfer rate by using as a search key the priority degree contained in said transmission data supplied from said higher level service application, establishing a connection in accordance with said acquired transfer rate and said transmission address contained in said transmission data, and thereafter, dequeuing said transmission data from said connection queue; and said communication driver transferring said transmission data over said established connection at said transfer rate.

19. A service management method according to claim 15, further comprising the steps of:

a higher level service application issuing a data transmission request by sending the transmission data containing the transmission address and the transfer rate to said communication driver;

if a connection is not established between said communication driver and said communication destination terminal for data transfer, said connection processing unit loading said transmission data supplied from said higher level service application in said connection queue, establishing a connection in accordance with said transmission address and said transfer rate contained in said transmission data supplied from said higher level service application, and thereafter dequeuing said transmission data from said connection queue; and said communication driver transferring said transmission data over said established connection at said transfer rate.

20. A service management method according to claim 15, further comprising the steps of:

preparing a priority degree/transfer rate conversion table at said communication driver, said conversion table storing a priority degree and a corresponding transfer rate;

a higher level service application issuing a data transmission request by sending the transmission data containing the transmission address and the priority degree to said communication driver;

if a connection is not established between said communication driver and said communication destination terminal for data transfer, said connection processing unit loading said transmission data supplied from said higher level service application in said connection queue, referring to said priority degree/transfer rate conversion table to acquire the transfer rate by using as a search key the priority degree contained in said transmission data supplied from said higher level service application, establishing a connection in accordance with said acquired transfer rate and said transmission address contained in said transmission data, and thereafter, dequeuing said transmission data from said connection queue; and said communication driver transferring said transmission data over said established connection at said transfer rate.

21. A connection-oriented network system, comprising:

a plurality of terminals;

a switch; and a line for connecting each of said plurality of terminals to said switch; wherein:

each of said plurality of terminals includes a communication driver, the communication driver of a transmission originating terminal from which data is transmitted includes a connection processing unit for establishing a connection to a transmission destination terminal, a connection management table and a connection queue for temporarily storing data during a connection process, said connection management table manages a correspondence between a transmission address and a connection number, said transmission address being used by said service application to identify the transmission destination terminal, and said connection number being assigned by a switch interconnecting terminals for allowing said communication driver and said switch to discriminate between connections, said connection processing unit establishes a connection to the transmission destination terminal, and said connection queue temporarily stores transmission data during a connection process, and said connection processing unit registers a transmission address and a corresponding connection number in said connection management table during a connection process, wherein further:

when a data transmission request is made to said communication driver by a service application, said communication driver referring to said connection management table, acquires a connection number in accordance with a transmission address designated by said service application and transmits transmission data from said service application over a connection identified by said acquired connection number, if a connection is not established between said transmission originating terminal and said transmission destination terminal for data transmission, said connection processing unit loads said transmission data supplied from said service application of said transmission originating terminal in said connection queue, establishes a connection to said transmission destination terminal designated by said service application, and after establishing the connection, dequeues said transmission data from said connection queue, and said communication driver transfers said dequeued transmission data over said established connection.

22. A network system according to claim 21, wherein said communication driver includes a connection management table for managing a correspondence between a transmission address used for identification of said transmission destination terminal by said service application, a service type discriminating between service applications and a connection number assigned by said switch for discrimination between connections by said communication driver and said switch.

23. A network system according to claim 21, wherein said communication driver includes a connection management table for managing a correspondence between a service type discriminating between service applications, a reception interface identifier such as a reception function address of each service application and a connection number assigned by said switch for discrimination between connections by said communication driver and said switch.

24. A connection-oriented network system, comprising:

a plurality of terminals;

a switch; and a line for connecting each of said plurality of terminals to said switch, wherein:

each of said plurality of terminals includes a communication driver;

the communication driver of a transmission originating terminal from which data is transmitted includes a connection management table for managing a correspondence between a transfer rate and a transmission address used for identification of said transmission originating terminal by a service application, said transmission address and said transfer rate being registered in said connection management table during an initialization process;

when a data transfer request is made from a service application, said communication driver of said transmission originating terminal refers to said connection management table to acquire the transfer rate for data transmission in accordance with said transmission address designated by said service application, and transmits transmission data an optional transfer rate.

25. A connection-oriented network system, comprising:

a plurality of terminals;

a switch; and a line for connecting each of said plurality of terminals to said switch, wherein:

each of said plurality of terminals includes a communication driver, the communication driver of a transmission originating terminal from which data is transmitted includes a connection management table for managing a correspondence between a transfer rate and a service type for discrimination between service applications, said service type and said transfer rate being registered in said connection management table during an initialization process, and when a data transmission request is made from a service application, said communication driver of said transmission originating terminal refers to said connection management table to acquire the transfer rate for data transmission in accordance with said service type designated by said service application, and transmits transmission data at said acquired transfer rate to thereby enable data transmission between service applications at an optional transfer rate.

26. A connection-oriented network system, comprising:

a plurality of terminals;

a switch; and a line for connecting each of said plurality of terminals to said switch, wherein:

each of said plurality of terminals includes a communication driver, and the communication driver of a transmission originating terminal from which data is transmitted includes:

a connection processing unit, a connection queue, and a connection management table said connection processing unit establishing a connection to a transmission destination terminal, wherein said connection queue temporarily stores transmission data during a connection process, and said connection management table manages a correspondence between a connection number, a transmission address, a service type and a transfer rate, said connection number being assigned by said switch for discrimination between connections by said communication driver and said switch, said transmission address being used for discrimination between transmission destination terminals, and said service type being used for discriminating between service applications, when a data transmission request is made from a service application, said communication driver refers to said connection management table, acquires a connection number and a transfer rate in accordance with a transmission address designated by said service application and transmits transmission data from said service application over a connection identified by said acquired connection number at the acquired transfer rate, if a connection is not still established between said communication driver and said transmission destination terminal for data transmission, said connection processing unit loads said transmission data supplied from a service application in said connection queue, establishes a connection to said transmission destination terminal designated by said service application in accordance with said transfer rate registered in said connection management table, and thereafter dequeues the transmission data from said connection queue, and said communication driver transfers said dequeued transmission data over said established connection at said transfer rate.

27. A connection-oriented network system according to claim 26, wherein said communication driver includes a priority degree/transfer rate conversion table for storing a priority degree and a corresponding transfer rate, and wherein further:

if a connection is not established between said communication driver and said communication destination terminal for data transfer, said connection processing unit load said transmission data supplied from a higher level service application in said connection queue, refers to said priority degree/transfer rate conversion table to acquire the transfer rate by using as a search key the priority degree contained in said transmission data supplied from said higher level service application, establishes a connection in accordance with said acquired transfer rate and said transmission address contained in said transmission data, and thereafter, dequeuing said transmission data from said connection queue; and said communication driver transfers said transmission data over said established connection at said transfer rate.

\* \* \* \* \*